United States Patent Office 3,839,588
Patented Oct. 1, 1974

3,839,588
PROCESS OF PREPARING HOP EXTRACTS
Francis Archibald Sweett, Black Rock, Pietro Casamento, Chadstone, and Robert Norton Taylor, Glen Waverley, Australia, assignors to Commonwealth Scientific and Industrial Research Organization, Campbell, Australia
No Drawing. Filed July 5, 1972, Ser. No. 269,206
Claims priority, application Australia, July 12, 1971, 5,520
Int. Cl. C12c 9/02
U.S. Cl. 426—349
20 Claims

ABSTRACT OF THE DISCLOSURE

A process of preparing a hop extract or an isomerized hop extract comprising treating a primary hop extract with an aqueous solution of an alkali so as to form a three-phase liquid mixture, one phase being a humulones phase containing humulones in the form of their alkali metal salts, a second phase being a water-immiscible solvent phase substantially free of humulones and containing lupulones, and a third phase being an aqueous phase substantially free of humulones.

BACKGROUND OF THE INVENTION

(1) Field of the Invention

The invention relates to processes for preparing hop extracts and isomerised hop extracts.

The terms "hop extract" and "isomerised hop extract" as used throughout the specification are to be understood as meaning extracts of hops containing alpha-acids and iso-alpha acids respectively. The term "alpha-acid" is a generic one covering the various humulones; the term "iso-alpha-acid" similarly describes the various iso-humulones.

(2) Description of the Prior Art

In recent years the traditional brewing procedure of adding hops to the wort has been replaced to an increasing extent by the use of hop extracts.

In most hop extraction processes a solvent such as hexane is used to extract selectively the desired flavour constituents, which are the hop essential oil and the soft resins which include the humulones, while avoiding extraction of the undesired hard resins and tannins. For convenience, this extract will be hereinafter referred to as the "primary hop extract." By simply evaporating the solvent an extract may be obtained which is suitable for adding to the wort in place of hops. It is, however, desirable to increase the bitterness, and thus the value, of the extracts by an isomerisation process in which the humulones are converted to the more bitter isohumulones.

Humulone isomerisation processes are described in J. E. Andersen and R. P. Hildebrand, Food Technology of Australia, 1968, 20, 64; W. Mitchell, Brewers' Guardian, March 1970, 51; and Australian Patent Specifications Nos. 410, 247 and 29,273/67, both in the name of Bush Boake Allen Ltd. and referred to in Mitchell's article at pages 55 and 56. In these processes the humulones present in the primary hop extract are separated by countercurrent liquid-liquid extraction with an aqueous alkali solution such as, for example, potassium carbonate. The primary solvent is then evaporated to give an extract containing the hop essential oil which can be used to confer hop character. The aqueous extract contains about one percent only of humulones which are isomerised by heating under controlled conditions of pH, temperature and time. With care the humulones are converted to isohumulones in about 75 percent yield; the loss is due mainly to the isohumulones reacting further to give humulinic acid which is not bitter.

Although the resulting isohumulone solution is suitable for on-site use to give a bitter flavour to wort or to brewed beer, it is so dilute that it is inconvenient and uneconomical to store or to transport. The instability of the isohumulone rules out concentration by conventional evaporation methods, so, in the process described by Andersen and Hildebrand, concentration is achieved by the expensive procedure of low temperature evaporation followed by freeze drying. The freeze dried product is a light powder which is unpleasant to handle. In the process outlined by Mitchell two methods are mentioned for concentrating the humulones or isohumulones, each of which is disclosed in the aforementioned Bush Boake specifications. One method involves a two-phase liquid-liquid extraction using a water-immiscible solvent which is sufficiently polar to extract the humulones or isohumulones from aqueous solution as their potassium salts, the extract being recoverable in the presence of water to furnish an aqueous solution of the potassium salts. The other method involves adding a water soluble salt of a cation capable of forming a water insoluble humulate or isohumulate, e.g. calcium chloride, to precipitate such a salt, filtering, dissolving the precipitate in a suitable organic solvent such as methanol, reacting with an alkali metal carbonate, e.g. potassium carbonate, filtering to remove calcium carbonate, and distilling the methanol.

SUMMARY

In an endeavour to produce a more concentrated humulones or isohumulones phase, and thus dispense with the need for concentration techniques, the present applicants have now discovered that by treating a primary hop extract with an aqueous alkaline solution under certain conditions, it is possible to form a readily separable three-phase liquid (as distinct from two-phase) mixture, one phase containing humulones in the form of their alkali metal salts in appreciably greater quantities than may be obtained by known methods such as those described above. A water-insoluble solvent phase substantially free of humulones and containing hop essential oil, and an aqueous phase substantially free of humulones makes up the mixture. Under these conditions, lupulones (β-acids) which are also present in the primary hop extract are only partly converted to their alkali metal salts so that most of the unconverted lupulones content remains in the solvent phase. Thus, the humulones phase is to a large extent purified from lupulones. As mentioned later, the presence of lupulones in the extract is clearly undesirable.

Accordingly, the present invention provides a process of preparing a hop extract or an isomerized hop extract comprising treating a primary hop extract with an aqueous solution of an alkali so as to form a three-phase liquid mixture, one phase being a humulones phase containing humulones in the form of their alkali metal salts, a second phase being a water-immiscible solvent phase substantially free of humulones and containing lupulones, and a third phase being an aqueous phase substantially free of humulones.

DESCRIPTION OF THE PREFERRED EMBODIMENTS

It will be readily apparent that the choice of solvent used to prepare the primary hop extract for use in the present process is clearly limited to those in which the alkali metal salts of the humulones are only sparingly soluble. By way of example, suitable solvents include hexane and similar hydrocarbon solvents such as petroleum ether. On the other hand, most chlorinated hydrocarbon solvents such as trichlorethylene and dichloromethane are unsuitable because they are good solvents for the alkali metal salts of the humulones. However, the process is operable with carbon tetrachloride as the primary solvent, provided the primary extract is prepared with a sufficiently high concentration of humulones, at least 1.5% w/w humulones, to offset the moderate solubility of the alkali metal salts of the humulones in carbon tetrachloride (about 0.4% w/w).

If desired, the aqueous solution may also contain one or more inert salts such as, for example, sodium and potassium sulphate, which assists (s) in the formation of the three liquid phases, or one or more buffer salts such as, for example, dipotassium hydrogen phosphate, which assist(s) in pH control.

Simple experiment will determine the conditions required to produce the desired three-phase mixture. By simple variation of alkali concentration, temperature and settling time, the desired mixture may be readily obtained and the phases separated.

It will be readily understood that the term "alkali," as used throughout the specification, is used in a broad sense to refer to compounds which when dissolved in water provide an aqueous alkaline solution.

Preferably, however, the aqueous alkaline solution is a potassium carbonate or potassium hydroxide solution. Referring to the former, an excess of carbonate, for example in the range of about 100% to 200%, is desirable to achieve substantially complete conversion of the humulones to salts. In accordance with the equation:

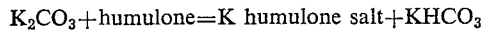

362 parts of humulones, or a slightly larger amount of substituted humulones, require 138 parts of potassium carbonate, and a convenient excess to use, as mentioned above, is about 100% to 200% over this requirement. Preferably the excess of carbonate is such that after reaction the aqueous phase has a pH of 10 to 10.5. The reaction may be effected by agitating the two solutions together at, or near, room temperature for about two minutes. On standing for about five minutes the reaction mixture separates into three phases:

1. A spent hexane phase, almost free of humulones. This contains lupulones and hop essential oil which is recovered for flavouring use by distilling the hexane.
2. An aqueous phase which is almost free of humulones and contains excess potassium carbonate and potassium hydrogen carbonate formed in accordance with the above equation.
3. A humulones salt phase containing about 50 percent by weight of humulones and about 10 percent by weight of lupulones, present as their potassium salts.

The three phases are separated readily without problems of emulsification. If, however, potassium carbonate solutions more dilute than about 8 percent by weight are used, emulsification problems arise, and an appreciable fraction of the humulones is dissolved by the aqueous phase. It is possible to use a 10 percent by weight potassium carbonate solution, but solutions around 12 percent by weight give rise to aqueous and humulones phases of nearly equal density which are difficult to separate. If solutions stronger than about 30 percent by weight potassium carbonate are used, the humulones phase becomes too viscous to fly freely. Generally speaking, the preferred range of concentrations is from 13 to 25 percent by weight of potassium carbonate. It is to be nonetheless appreciated that reasonable concentrations of humulones or isohumulones may in some instances still be obtained employing less than 8 percent by weight, or more than 30 percent by weight, of the carbonate.

In one preferred form of the invention, a primary hop extract in hexane, containing typically from 0.5 to 4 percent by weight of humulones, is treated with an aqueous solution of potassium carbonate containing about 20 percent by weight of potassium carbonate.

As is well known, humulones can be converted to the more bitter isohumulones by isomerization under alkaline conditions. Isomerization may be carried out either before, during or after separation of the phases.

After separation, isomerisation may be effected conveniently by mixing the humulones phase with the aqueous phase and heating. Suitable heating conditions are 95 to 100° C. for 35 to 60 min. The pH of the mixture during isomerisation is in the range 10.2 to 10.6. While the isomerisation is proceeding, traces of hexane or other primary solvent may be stripped from the mixture by passing a slow stream of nitrogen or another inert gas through the mixture. At the same time some water also distils. By using the above conditions for isomerisation, the yield of isohumulone may well be nearly theoretical.

After isomerisation, the mixture is cooled, stirring is stopped, and the isohumulones phase is then readily separated. This phase is found to contain about 50 percent by weight of isohumulones, present as potassium salts, and about 15 to 25 percent of water. It is a liquid which flows freely at room temperature. On storing at 5° C. it gels but on warming to room temperature it again flows freely. In this liquid form the product is readily dissolved in water; this is desirable for metering into beer. The potassium salts of the isohumulones are completely soluble in water provided that calcium and magnesium ions have been removed from the water. Dissolution in water is faciliated by warming.

The aqueous phase, which is separated after isomerisation, contains about 1.3 percent of the total isohumulones. To avoid loss of isohumulones, the aqueous phase is regenerated by adding a strong solution of potassium hydroxide in an amount sufficient to convert potassium hydrogen carbonate to potassium carbonate, and then recycled to treat further primary hop extract.

Isomerization may be effected before or during, instead of after, separation, for example by treatment of the primary extract with an aqueous solution of potassium hydroxide under conditions such as to form not only the three-phase mixture but also isomerize the humulones content. Treatment at room temperature with about 20% potassium hydroxide solution is preferred.

As already mentioned, the process results in less amounts of lupulones in the humulones phase. It is known that the presence of lupulones in significant amounts is not desirable because they are sparingly soluble in beer and on precipitation occlude or adsorb some of the iso alpha-acids, thereby reducing the yield of the latter. Thus, it will be appreciated that an advantage of the present process is, as already mentioned, that some separation of lupulones from the humulones phase is achieved. If a greater degree of separation is to be effected, use may be made of a counter-current process in which the humulones phase is contacted with fresh primary hop extract, or with fresh primary solvent and an aqueous buffer phase at pH 8.5 to 9.5.

Primary hop extracts, prepared by extracting hops with hexane, contain minor amounts of fatty acids and brown uncharacterized compounds which are sparingly soluble in water under acid conditions and so would be expected to contribute to the formation of haze in beer. It is desirable to remove these compounds from the primary extract before the treatment designed to separate the humulones. It has been found that the removal of these compounds may be readily effected, without appreciable loss of humulones, by contacting the primary hop extract with a slightly alkaline aqueous solution of an alkali metal salt under pH conditions chosen to permit the separation of a phase containing the salts of strong organic acids and substantially free of the salts of the humulones. A pH between 7 and 8 is suitable.

Preferably the primary hop extract is contacted at pH 7.6 with a buffer solution of potassium dihydrogen phosphate and dipotassium hydrogen phosphate containing about 16 percent w/w of the combined phosphates. Under these conditions the fatty acids react to form a liquid organic salt phase in which the dark brown compounds are suspended. This third liquid phase is readily separated from the solvent and aqueous phases and is discarded. The aqueous buffer may be re-used to treat further primary hop extract.

The invention will now be further illustrated by the following examples.

EXAMPLE 1

332 g. of a hop extract in hexane, containing 12.6 g. (3.8 percent by weight) of humulones, was shaken for 5 minutes at room temperature with 71.7 g. of 20 percent by weight aqueous potassium carbonate solution. After standing, the following three phases were separated, weighed and analysed for humulones:

|  | Weight, g. | Humulones content, g. |
|---|---|---|
| Humulones phase | 29.80 | 11.25 |
| Aqueous phase | 64.47 | 0.04 |
| Spent hexane phase | 309.6 | 0 |

After removal of samples (about 0.2 g. from each) the humulones phase was mixed with the aqueous phase. The mixture was isomerised by heating to 95° C. for 35 minutes during which time a slow stream of nitrogen was passed through the mixture. The phases were then cooled, separated, weighed and analysed for isohumulones.

|  | Weight, corrected for sample previously withdrawn, g. | Isohumulones content, g. |
|---|---|---|
| Isohumulone phase | 27.42 | 11.84 |
| Aqueous phase | 57.02 | 0.16 |
| Loss during heating, mainly water | 9.68 |  |

The discrepancy between the humulone content of the hexane extract, 12.6 g., and the yield of isohumulone, 12.0 g., may not be significant in view of the interferences of other compounds present with the analyses.

EXAMPLE 2

39.9 g. of 20 percent aqueous potassium carbonate solution was used to separate the humulones from five portions of a hop extract in hexane. Each portion of the hop extract was, in turn, shaken with the whole of the potassium carbonate solution. After standing to permit separation of the three liquid phases the spent hexane was removed and the next portion of hop extract was then introduced and shaken with the aqueous and humulone phases. In all 1388 g. of hexane extract was treated. This contained 7.02 g. (0.506 percent by weight) of humulones as determined by conductimetric titration with lead acetate. The resulting humulones phase weighed 13.35 g. and contained 6.54 g. of humulones as determined by spectrophotometry. The aqueous phase weighed 35.91 g.

The aqueous and humulones phases were mixed and heated, whilst a slow stream of nitrogen was passed through the mixture. Heating was first carried out at 85° C. for 35 minutes and then at 95° C. for 30 minutes. During this time, about 20 g. of water vapour was entrained in the stream of nitrogen. The isomerised reaction mixture was then cooled and the phases separated. The isohumulones phase contained 52 percent by weight of isohumulones, as determined by spectrophotometry. The yield of isohumulones, corrected for samples removed, was 6.45 g. In addition, the aqueous phase contained 0.27 percent by weight of isohumulones (0.07 g.).

EXAMPLE 3

This example illustrates the selective removal of fatty acids and brown uncharacterized compounds from primary hop extracts.

A primary hop extract in hexane (500 ml.) was shaken for two minutes with an aqueous buffer solution at pH 7.6, the buffer was prepared from 45 g. of 17.4 percent w/w dipotassium hydrogen phosphate solution and 10 g. of 13.6 percent w/w potassium dihydrogen phosphate solution. After standing for five minutes 0.36 g. of a third liquid phase had separated and was removed. This phase contained the potassium salts of strong organic acids and a suspension of brown compounds, it was acidified, extracted with hexane, and found to yield 0.65 milliequivalents of organic acids soluble in hexane.

After the above preliminary treatment the hop extract was washed with dilute hydrochloric acid and water and analysed. It was found to contain 3.1 percent w/w of humulones (by conductimetric titration with lead acetate) and 1.9 percent w/w of other resin acids (by titration in alcohol with sodium hydroxide). The other resin acids were calculated as lupulones with molecular weight 414.

EXAMPLE 4

158.6 g. of a primary hexane extract containing 3.1 percent w/w of humulones and 1.9 percent w/w of other resin acids, calculated as lupulones, was agitated for two minutes with 40 g. aqueous alkali. The alkali was prepared by dissolving 4.4 g. dipotassium hydrogen phosphate in 30.1 g. water and adding 5.5 g. of 4 N potassium hydroxide solution. During the reaction the pH of the alkali fell from 12.15 to 10.7. After standing for five minutes the three product phases were separated. The resin salt phase weighed 8.90 g. and contained 49.3 percent w/w of humulones and 10.7 percent w/w of other acids, calculated as lupulones. The spent hexane phase (151.6 g.) contained 0.105 percent humulones and 1.36 percent lupulones. The aqueous phase (36.2 g.) contained 0.238 percent humulones and 0.026 percent lupulones.

EXAMPLE 5

50.0 g. of a primary hexane extract, containing 2.97 percent w/w of humulones (by lead acetate titration) and 1.63 percent w/w of lupulones or other non-humulone acids, calculated as lupulones, as determined by titration with potassium hydroxide, was shaken for two minutes with a mixture of 20.0 g. of aqueous 20 percent w/w sodium sulphate solution and 11.54 g. of aqueous 20 percent w/w sodium carbonate solution. The pH of the aqueous phase after the reaction was 9.67. After standing for ten minutes the reaction mixture had formed three liquid phases which were separated. The resin sodium salt phase weighed 3.21 g. and was found on analysis to contain 45.4 percent w/w of humulones and 9.3 percent of other resins calculated as lupulones. The spent hexane phase (47.56 g.) contained 0.089 percent humulones and 1.36 percent lupulones. The aqueous phase (30.77 g.) contained 0.011 percent humulones and 0.097 percent lupulones.

EXAMPLE 6

A hexane hop extract was prepared from hops of the variety Pride of Ringwood by extraction at room temperature with freshly distilled hexane 372 g. of the extract was agitated for 2 minutes with 49.4 g. of an aqueous buffer solution of pH 7.57 prepared by mixing 45 g. of 17.4% w/w dipotassium hydrogen phosphate solution and 10 g. of 13.6% w/w potassium dihydrogen phosphate solution. After standing 10 minutes the three product liquid phases were separated. The phase containing potassium salts of the unwanted strong acids was rejected; it weighed 0.75 g.

162.6 g. of the hexane extract obtained from the above purification treatment was agitated for 2 minutes with 39.9 g. of an alkaline solution prepared from 4.5 g. of dipotassium hydrogen phosphate, 6.0 g. of 4 N potassium hydroxide solution and 29.5 g. of water. After standing three product liquid phases separated; these were weighed and analysed. The following table shows the analyses. The separated aqueous phase was at pH 10.8.

|  | Weight, g. | Humulones by lead titration | | Total acids as calculated, mol wt. 362 | |
| --- | --- | --- | --- | --- | --- |
|  |  | Percent | Gram | Percent | Gram |
| Purified hexane extract | 162.6 | 3.17 | 5.15 | 4.77 | 7.76 |
| Spent hexane phase | 156.0 | 0.078 | 0.12 | 1.18 | 1.34 |
| Aqueous phase | 36.15 | 0.245 | 0.09 | 0.27 | 0.10 |
| Humulone salt phase | 9.20 | 51.9 | 4.77 | 60.8 | 5.60 |

EXAMPLE 7

This example illustrates the purification of a humulone phase by removal of lupulones and other resins which are weaker acids than the humulones. This selective removal is effected by contacting the humulone salt with hexane in the presence of an aqueous buffer solution having a pH in the range 8.5 to 9.5.

8.83 g. of the humulone salt phase prepared in the last example was agitated for 2 minutes with 5.04 g. of 0 67 molar dipotassium hydrogen phosphate solution (pH 9.34) and 75 g. of hexane. The hexane phase was then removed from the mixture and replaced by a second 75 g. portion of hexane. 1.1 g. of molar potassium dihydrogen phosphate solution was added and the mixture was agitated again for 2 minutes. The second hexane portion was removed and replaced by a third 75 g. portion of hexane. Another 1.1 g. portion of molar potassium dihydrogen phosphate solution was added and the mixture agitated again. The three liquid phases were then separated. The aqueous phase was found to be at pH 9.04. The following table shows the analyses of the humulone salt phases before and after this treatment and the resins found in the three portions of hexane. During the above purification about 0.7 g. of water was transferred from the humulones salt phase to the aqueous phase.

|  | Weight, g. | Humulones by lead titration | | Total acids calculated as mol wt. 362 | |
| --- | --- | --- | --- | --- | --- |
|  |  | Percent | Gram | Percent | Gram |
| Feed humulone salt | 8.83 | 51.9 | 4.58 | 60.8 (5) | 5.37 |
| Purified humulone salt | 7.31 | 55.7 | 4.07 | 60.8 | 4.44 |
| 1st portion of hexane | 75 | 0.010 | 0.007 | 0.315 | 0.236 |
| 2d portion of hexane | 75 | 0.043 | 0.032 | 0.300 | 0.225 |
| 3d portion of hexane | 75 | 0.29 | 0.218 | 0.380 | 0.285 |

EXAMPLE 8

Most of the purified humulone salt phase (5.61 g.) prepared in the last example was isomerised by heating for 1 hour at 95 to 99° C. with 7.52 g. of an aqueous carbonate buffer solution at pH 10.45. The buffer was prepared by mixing M. $K_2CO_3$ and 2M. $KHCO_3$ solutions.

During the heating a slow stream of nitrogen was passed through the mixture. The nitrogen served to mix the two phases, to exclude air and to strip traces of hexane from the resin salt. The evaporation of water during the heating amounted to 2.9 g.

After cooling, the isohumulone salt phase was separated from the aqueous phase. A sample of the product, when examined by thin layer chromatography, contained no detectable degradation product of humulones. The analyses of the humulone and isohumulone salt phases which are given below indicate that the yield during the isomerisation was about 90 percent.

|  | Humulone salt | Isohumulone salt |
| --- | --- | --- |
| Weight, g | 5.61 | 5.18 |
| Lead titratables, as M.W. 362, percent | 55.7 | 67.8 |
| Total resins by NaOH, M.W. 362, percent | 60.8 | 70.0 |
| Total resins by counter current analysis, percent |  | 71.4 |
| Humulones by polarimetry, percent | 58.9 |  |
| Isohumulones, counter current analysis, percent |  | 57.4 |

EXAMPLE 9

255 g. of a hop extract in carbon tetrachloride was treated to remove unwanted strongly acidic compounds by agitating with 19.4 ml. of an aqueous buffer solution at pH 7.57. The buffer was prepared by mixing 17.4% w/w dipotassium hydrogen phosphate solution and 13.6% w/w potassium dihydrogen phosphate solution. The aqueous phase and the phase containing the salts of the strongly acidic compounds were separated from the carbon tetrachloride extract and were discarded. A sample of the carbon tetrachloride extract was reserved for analysis and the remainder, 234 g., was treated to separate a humulones salt phase by shaking for 2 minutes with 33.3 g. of 15% w/w aqueous potassium carbonate solution. After allowing to stand for 10 minutes the three product phases were separated. The separated aqueous phase was at pH 10.4. The following table of analyses shows that about 76% of the humulones in the extract were concentrated into the humulones salt phase.

|  | Weight, g. | Humulones | | Total resin acids | |
| --- | --- | --- | --- | --- | --- |
|  |  | Percent | Gram | Percent | Gram |
| Carbon tetrachloride extract | 234 | 1.94 | 4.54 | 3.46 | 8.10 |
| Spent carbon tetrachloride | 226 | 0.39 | 0.88 | 1.64 | 3.71 |
| Aqueous phase | 32 | 0.21 | 0.07 | 0.23 | 0.07 |
| Humulones salt phase | 8.95 | 38.3 | 3.43 | 43.6 | 3.90 |

EXAMPLE 10

This example illustrates the purification of humulones salt phase by exchanging humulones for some of the impurity resins present in the salt phase which are weaker acids than the humulones. In particular the lupulones are exchanged. The exchange is effected by contacting the humulones salt phase with hexane hop extract previously selectively stripped of unwanted strong acids as in Example 3. During the exchange treatment the undesired weaker acids leave the salt phase and enter the hexane phase; they are replaced by humulones which leave the hexane phase and enter the salt phase.

The hexane hop extract was purified from unwanted strong acids by treatment with an aqueous potassium phosphate buffer solution at pH 7.97 as in Example 3. After the treatment the hexane extract contained 3.10% w/w of humulones, by lead acetate titration, and 4.76% w/w of total resin acids, calculated as of M.W. 362, as estimated by sodium hydroxide titration. A humulones salt phase was prepared from 158.6 g. of the purified hexane hop extract by shaking with a solution prepared from 30.1 g. water, 4.4 g. dipotassium hydrogen phosphate and 5.5 g. of 4 N potassium hydroxide solution. The aqueous phase separated after the reaction was at pH 10.7. The humulones salt phase which was obtained weighed 8.90 g. and a sample was found to contain 49.3 w/w of humulones and 58.6% w/w of total resins. Most of this humulones salt phase, 8.60 g., was purified by exchange by shaking for 5 minutes with 179 g. of the same hexane hop extract, previously purified from strong acids as above. After standing and separating the resulting purified humulones salt phase was found to contain 52.4% w/w of humulones and 58.9% w/w of total resins. Thus during the exchange purification treatment the ratio of humulones to total resins increased from 0.84 to 0.89.

We claim:

1. A process of preparing a concentrated hop extract or an isomerized hop extract comprising treating a primary hop extract, containing humolones and lupulones in a water-immiscible solvent, with an aqueous solution of an alkali having a weight percent concentration of about 8–30, to form a three-phase liquid system, one phase being a humulones phase containing humulones in the form of their alkali metal salts, a second phase being a water-immiscible solvent phase substantially free of humulones and containing lupulones, and a third phase being an aqueous phase substantially free of humulones, and recovering said humulones phase from the other phases of the system.

2. A process according to claim 1, wherein the solvent employed to prepare the primary hop extract is selected from hexane, petroleum ether and carbon tetrachloride.

3. A process according to claim 1, wherein at least one inert salt is included in the aqueous alkali solution to assist in the formation of the three liquid phases.

4. A process according to claim 3, wherein the inert salt is selected from sodium sulphate and potassium sulphate.

5. A process according to claim 1, wherein the aqueous solution also contains at least one buffer salt which assists in pH control.

6. A process according to claim 5, wherein the buffer salt is dipotassium hydrogen phosphate.

7. A process according to claim 1, wherein the alkali is selected from potassium carbonate and potassium hydroxide.

8. A process according to claim 1, wherein the alkali is potassium carbonate employed in an excess in the range of about 100% to 200%, relative to the humulones content in the primary hop extract.

9. A process according to claim 8, wherein the excess is such that after reaction the aqueous phase has a pH of 10 to 10.5.

10. A process according to claim 7, wherein the potassium carbonate solution has a weight percent concentration of 13 to 25.

11. A process according to claim 7, wherein the primary hop extract contains 0.5 to 4 percent by weight of humulones and the potassium carbonate solution contains about 20 percent by weight of potassium carbonate.

12. A process according to claim 1, for the preparation of an isomerized hop extract, wherein isomerization of the humulones phase is effected following separation of the three liquid phases, to provide a isohumulones phase and an aqueous phase.

13. A process according to claim 12, wherein a stream of a gas selected from nitrogen and like inert gases is passed through the reaction mixture during isomerization so as to remove, if present, traces of primary solvent.

14. A process according to claim 12, wherein the aqueous phase is separated from the isohumulones phase, treated with an aqueous solution of potassium hydroxide, and recycled to treat further primary hop extract.

15. A process according to claim 1, for the preparation of an isomerized hop extract, wherein isomerization is effected before or during separation of the three liquid phases.

16. A process according to claim 15, wherein the primary extract is treated with an aqueous solution of potassium hydroxide.

17. A process according to claim 1, wherein the primary hop extract contains minor amounts of fatty acids and prior to treatment to form the three phase system is treated with an alkaline aqueous solution of at least one alkali metal salt at a pH of between 7 and 8 to cause the separation of a phase containing the salts of said acids.

18. A process according to claim 17, wherein the primary hop extract is treated with a buffer solution of potassium phosphate and dipotassium hydrogen phosphate.

19. A process according to claim 1, wherein the humulones phase is contacted with hexane in the presence of an aqueous buffer solution at a pH in the range 8.5 to 9.5, whereby acids present in the humulones phase which are weaker than the humulones are removed from the humulones phase.

20. A process according to claim 1, wherein the humulones phase is contacted with hexane hop extract which is free of strong acids, whereby acids present in the humulones phase which are weaker than the humulones are replaced by humulones from the hexane hop extract.

References Cited
UNITED STATES PATENTS 3,364,265   1/1968   Klingel et al. _____ 99—52 X LIONEL M. SHAPIRO, Primary Examiner R. B. PENLAND, Assistant Examiner